United States Patent [19]

Udagawa et al.

[11] Patent Number: 4,803,965
[45] Date of Patent: Feb. 14, 1989

[54] STEEL LAMINATE TYPE CYLINDER HEAD GASKET

[75] Inventors: Tsunekazu Udagawa, Ichikawa; Yoshio Yamada, Koshigaya, both of Japan

[73] Assignee: Ishikawa Gasket Co., Ltd., Tokyo, Japan

[21] Appl. No.: 69,670

[22] Filed: Jul. 6, 1987

[30] Foreign Application Priority Data

Jul. 7, 1986 [JP] Japan .................. 61-104213[U]

[51] Int. Cl.$^4$ .................................. F02F 11/00
[52] U.S. Cl. ......................... 123/193 CH; 277/235 B
[58] Field of Search ............. 123/193 CH, 41.74, 273; 277/235 B, 207 R, 213

[56] References Cited

FOREIGN PATENT DOCUMENTS 3245383  6/1984  Fed. Rep. of Germany ... 277/235 B
0090745  5/1984  Japan .............................. 277/235 B Primary Examiner—Willis R. Wolfe
Assistant Examiner—M. Macy
Attorney, Agent, or Firm—Frank J. Jordan; C. Bruce Hamburg; Manabu Hanesaka

[57] ABSTRACT

A steel laminate gasket of the invention is installed in an engine with an auxiliary combustion chamber. The gasket comprises a first plate having at least one first sealing area around a cylinder bore and at least one second sealing area adjacent the first sealing area, on which a mouth plate for defining the auxiliary combustion chamber is placed, and at least one second plate situated adjacent to the first plate. The first plate is provided with a plurality of curved beads disposed at a predetermined distance away from each other and situated inside and outside the second sealing area. The beads are formed so that a recovery amount of the bead when pressurized decreases gradually from an inner bead to an outer bead.

8 Claims, 2 Drawing Sheets

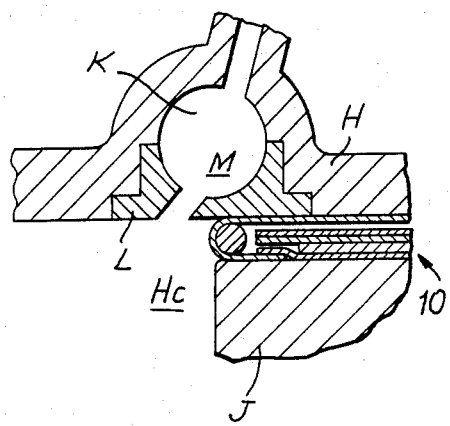
FIG. 1
PRIOR ART
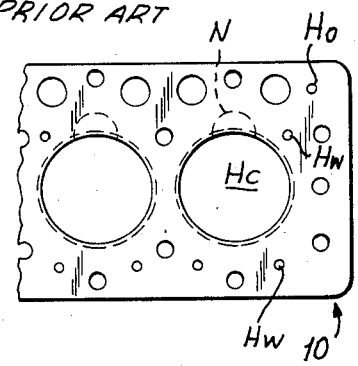
FIG. 2
PRIOR ART
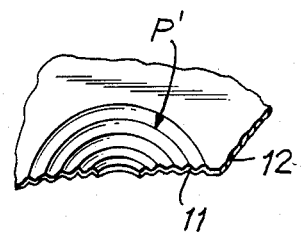
FIG. 3
PRIOR ART
FIG. 4
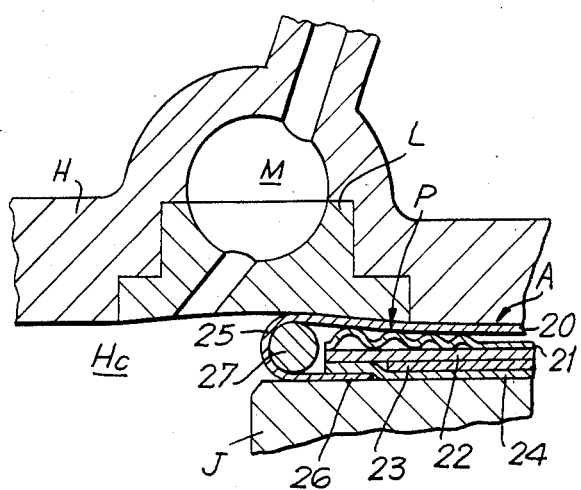

STEEL LAMINATE TYPE CYLINDER HEAD GASKET

BACKGROUND OF THE INVENTION AND RELATED ART STATEMENT

The present invention relates to a steel laminate type cylinder head gasket for an internal combustion engine with an auxiliary combustion chamber.

An engine with an auxiliary combustion chamber is known, which comprises, as shown in FIG. 1, a cylinder block J having at least one cylinder bore Hc, a cylinder head H having a depression K, and a mouth plate L attached to the cylinder head H to cover the depression K for constituting an auxiliary combustion chamber M. A gasket 10 is installed between the cylinder head H and the cylinder block J. As a result, the gasket 10 supports a part N of the mouth plate L (FIG. 2). Namely, the part N of the mouth plate L is located on and supported by the gasket 10.

When the mouth plate L is installed in the cylinder head H, a lower surface of the cylinder head H must be precisely flush with a lower surface of the mouth plate L. Otherwise, sealing around the cylinder bore Hc of the cylinder block J can not be securely made.

Actually, it is very difficult to prepare the cylinder head H and the mouth plate L so that the lower surfaces thereof are flush with each other. Generally, the lower surface of the mouth plate L slightly projects or dents from the lower surface of the cylinder head H. Moreover, even if the lower surfaces of the cylinder head H and the mouth plate L are flush with each other when the mouth plate L is installed in the cylinder head H, in case the engine is operated, the lower surfaces of the cylinder head H and the mouth plate L do not become flush with each other due to heat of the engine.

Under the circumstances, unless a gasket situated between the cylinder head H and the cylinder block J can provide sufficient elasticity in any situation, sealing around the cylinder head H, cylinder block J and mouth plate L can not be properly made. However, since a conventional steel laminate gasket 10 as shown in FIG. 1 is formed of a plurality of steel plates and a wire ring, the steel laminate gasket 10 can not provide sufficient elasticity to properly seal around the cylinder bore. Therefore, it was desired to provide a steel laminate gasket which can securely seal around the cylinder bore.

In view of the drawbacks of the conventional steel laminate gasket, an improved steel laminate gasket is proposed in Japanese patent application No. 57-199777 (published on May 25, 1984 as Publication No. 59-90745), wherein one of plates forming a steel laminate gasket is provided with a plurality of projections or beads at an area P' corresponding to the part N of the mouth plate L. As shown in FIG. 3, beads 11 are concentrically arranged at the part P' of a plate 12.

The steel laminate gasket with the beads 11 as disclosed in Publication No. 59-90745 can properly seal around the cylinder bore Hc, as compared with a steel laminate gasket without beads. However, the steel laminate gasket with the beads 11 can not perfectly seal.

As a result of study, it was noticed that when the engine with the auxiliary combustion chamber is operated, the mouth plate L may move toward the auxiliary combustion chamber. In particular, the center of the mouth plate L dents deepest, and the dent becomes shallower as it goes toward the edge of the mouth plate L. This is because the mouth plate L separating the combustion chamber from the auxiliary combustion chamber is severely affected by heat and pressure changes from the combustion chamber. The steel laminate gasket with the beads 11 as disclosed in Publication No. 59-90745 could not properly absorb movement of the mouth plate L caused by the heat and pressure changes of the combustion chamber. Namely, the gasket with the beads 11 can seal a shallow portion of a dent but can not seal a deep portion thereof. Consequently, gas leakage may happen.

Accordingly, one object of the present invention is to provide a steel laminate gasket for an engine with an auxiliary combustion chamber, which can seal properly around the cylinder bore.

Another object of the present invention is to provide a steel laminate gasket as stated above, wherein different sealing pressure applied to the gasket can be properly absorbed.

A further object of the present invention is to provide a steel laminate gasket as stated above, wherein the gasket can be easily and economically manufactured.

Further objects and advantages of the invention will be apparent from the following description of the invention.

SUMMARY OF THE INVENTION

In accordance with the present invention, a steel laminate type cylinder head gasket is installed in an internal combustion engine having a cylinder block with a cylinder bore, a cylinder head with an auxiliary combustion chamber and a mouth plate attached to the cylinder head for defining the auxiliary combustion chamber. The gasket is situated around the cylinder bore between the cylinder head and the cylinder block.

The gasket comprises a first plate having at least one first sealing area around the cylinder bore and at least one second sealing area adjacent the first sealing area, on which the mouth plate is placed, and at least one second plate situated adjacent to the first plate to form the steel laminate gasket. The second sealing area is defined by a curved outer line corresponding to a part of a contour of the mouth plate and an inner line corresponding to a part of a contour of the cylinder bore.

The first plate is provided with a plurality of curved beads disposed at a predetermined distance away from each other and situated inside and outside the second sealing area. The beads are formed so that a recovery amount of the bead when pressurized, i.e., resiliency of the bead, decreases gradually from an inner bead to an outer bead.

The beads are curved and arranged in the form of water rings concentrically with the outer line. An inner bead is greater in height than an outer bead, respectively, to provide a desired recovery amount to the beads. The recovery amount of the bead may be adjusted by changing projecting angles of the bead relative to the horizontal plane of the first plate or width of the bead. A material for the first plate may be changed for changing recovery amount of the bead.

The first plate may further be provided with a curved auxiliary bead situated in the second sealing area at a predetermined distance away from the inner line. The end portions of the beads intercept the auxiliary bead. The first plate may include a seal bead extending around the cylinder bore for sealing the first sealing area. The seal bead in the second sealing area constitutes the auxiliary bead.

BRIEF DESCRIPTION OF THE DRAWINGS

FIG. 1 is an explanatory section view of a conventional gasket installed in an engine with an auxiliary combustion chamber;

FIG. 2 is a plan view of a part of the conventional gasket;

FIG. 3 is an explanatory perspective view of a part of a conventional steel plate;

FIG. 4 is an explanatory section view of a first embodiment of a gasket of the present invention installed in an engine with an auxiliary combustion chamber;

DETAILED DESCRIPTION OF PREFERRED EMBODIMENTS

Figure 5:
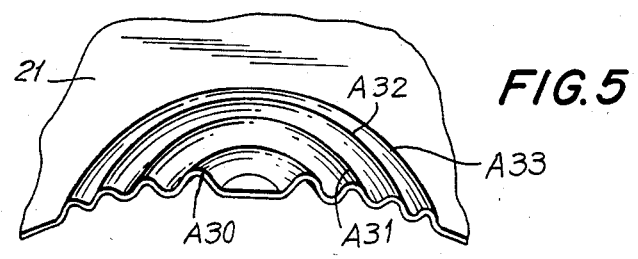
FIG. 5 is a perspective view of a part of a steel plate with beads of the first embodiment of the gasket of the invention.

Referring to FIG. 4, a first embodiment A of a steel laminate gasket of the invention is installed in an engine with an auxiliary combustion chamber. Namely, the gasket A is situated between the cylinder block J and the cylinder head H with the mouth plate L for forming the auxiliary combustion chamber M. The lower surface of the mouth plate L is shown to dent slightly toward the auxiliary combustion chamber M. The gasket A seals partly around the mouth plate L and entirely around the cylinder bore Hc on the cylinder block J.

The gasket A is provided with a plurality of cylinder bores Hc, water holes Hw, oil holes Ho and so on as in the conventional gasket 10. The gasket A comprises an upper plate 20, a lower plate 24 and three middle plates 21, 22, 23. The upper plate 20 is curved at a curved portion 25 adjacent the cylinder bore Hc and is turned so that a flange 26 is located outside the lower plate 24. A seal ring 27 is situated adjacent the curved portion 25. The curved portion 25 and the seal ring 27 substantially seal around the cylinder bore Hc.

Figure 6:
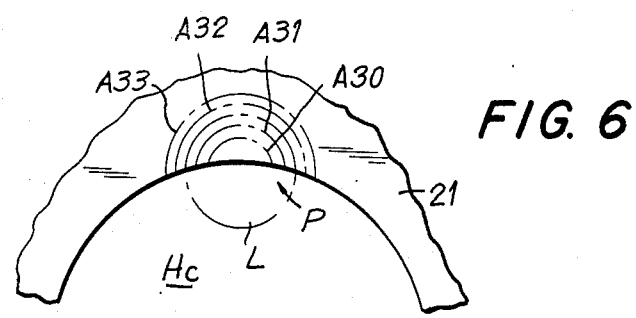
FIG. 6 is an explanatory plan view of a part of the steel plate of the first embodiment of the gasket shown in FIG. 5.

As clearly shown in FIGS. 5 and 6, the middle plate 21 is provided with four beads A30, A31, A32, A33 inside and outside an area P on which a part of the mouth plate L is mounted. The beads A30-A33 are arranged in the form of water rings concentrically with the contour of the plate L. The beads A30, A31 are located inside the area P, while the beads A32, A33 are located outside the area P.

The height of the bead A30 is the highest among the beads A30-A33, and the height of the bead becomes lower in order as it goes outwardly. Namely, a recovery amount of the bead when pressurized decreases gradually from the bead A30 to the bead A33. As a result, even if the central portion of the mouth plate L deeply dents toward the auxiliary combustion chamber M in operation as shown in FIG. 4, the bead A30 can seal thereat and provide sufficient sealing pressure against the central portion of the mouth plate L.

The beads A30, A31 operate to hold the mouth plate L in position and seal between the mouth plate L and the cylinder block J even if the mouth plate deeply dents. The beads A32, A33 operate to seal between the cylinder head H and the cylinder block J outside the area P.

In the gasket A, the beads A30-A33 are provided on the plate 21. However, the beads A30-A33 may be provided on the plates 20, 22, 23, 24 instead of the plate 21. Similarly, the width of the beads may be changed to obtain a desired recovery amount instead of changing the height of the beads. Even if modified, the gasket A can properly seal around the cylinder bore.

Figure 7:
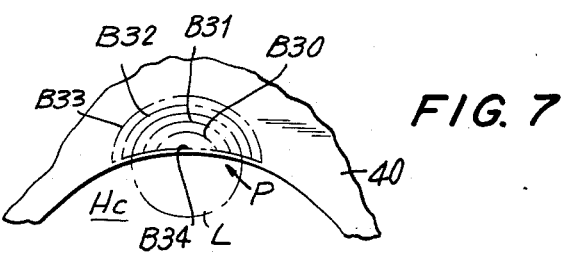
FIG. 7 is an explanatory plan view of a part of a steel plate similar to FIG. 6 of a second embodiment of the gasket of the invention.

FIG. 7 shows a second embodiment B of a steel laminate gasket of the present invention. The gasket B comprises the steel plates 20, 22, 23, 24 and the seal ring 27, as in the gasket A. The gasket B includes a steel plate 40 instead of the plate 21 in the gasket A.

The plate 40 is provided with beads B30, B31, B32, B33 similar to the beads A30-A33 respectively, and a curved auxiliary bead B34 situated adjacent to and at a predetermined distance away from the cylinder bore Hc. The bead B34 extends over the area P and intercepts the ends of the beads B30-B33. The beads B30-B33 operate as in the beads A30-A33, while the bead B34 operates to seal between the mouth plate L and the cylinder block J near the cylinder bore Hc.

Figure 8:
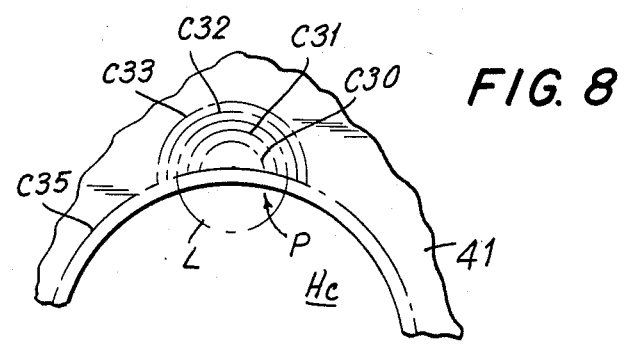
FIG. 8 is an explanatory plan view of a part of a steel plate similar to FIG. 6 of a third embodiment of the gasket of the invention.

FIG. 8 shows a third embodiment C of a steel laminate gasket of the present invention. The gasket C comprises the steel plate 20, 22, 23, 24, as in the gasket A. The gasket C includes a steel plate 41 instead of the plate 21 in the gasket A.

The plate 41 is provided with beads C30, C31, C32, C33 similar to the beads A30-A33 respectively, and a circular bead C35 around the cylinder bore Hc. The ends of the beads C30-C33 intercept the bead C35. The bead C35 provides sealing pressure, when tightened, around the cylinder bore Hc. Therefore, the gasket C does not include a seal ring as in the gasket A. The gasket C operates as in the gasket A.

In the present invention, a plurality of beads are formed on and around the area P adjacent the mouth plate L so that a recovery amount of the bead when pressurized decreases gradually from an inner bead to an outer bead. As a result, even if the mouth plate L irregularly and unevenly dents while the engine is operated, leakage around the mouth plate L is substantially prevented.

While the invention has been explained with reference to the specific embodiments of the invention, the explanation is illustrative and the invention is limited only by the appended claims.

What is claimed is:

1. A steel laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, comprising:

a first plate having at least one first sealing area around the cylinder bore and at least one second sealing area adjacent the first sealing area, on which the mouth plate is placed, said second sealing area being defined by a curved outer line corresponding to a part of a contour of the mouth plate and an inner line corresponding to a part of a contour of the cylinder bore, said first plate having a plurality of curved beads disposed at a predetermined distance away from each other and situated inside and outside the second sealing area, said beads being formed so that resiliency of the bead decreases gradually from an inner bead to an outer bead, and at least one second plate situated adjacent to the first plate to form the steel laminate gasket.

2. A steel laminate type cylinder head gasket according to claim 1, wherein said beads are curved and arranged in the form of water rings concentrically with the outer line.

3. A steel laminate type cylinder head gasket according to claim 2, wherein an inner bead is greater in height than an outer bead, respectively.

4. A steel laminate type cylinder head gasket according to claim 3, further comprising a curved auxiliary bead situated in the second sealing area at a predetermined distance away from the inner line, end portions of the beads intercrossing the auxiliary bead.

5. A steel laminate type cylinder head gasket according to claim 4, further comprising a seal bead extending around the cylinder bore for sealing the first sealing area, said seal bead in the second sealing area constituting the auxiliary bead.

6. A steel laminate type cylinder head gasket according to claim 4, further comprising a seal ring extending around the cylinder bore for sealing the first sealing area, said beads for sealing the second sealing area being located outside the seal ring.

7. A steel laminate type cylinder head gasket according to claim 6, further comprising an outer plate situated above the first plate and having a curved portion around the cylinder bore and a flange extending outwardly from the cylinder bore, said seal ring being situated between the outer plate and the flange and inside the curved portion.

8. A steel laminate type cylinder head gasket to be installed in an internal combustion engine having a cylinder block with a cylinder bore, a cylinder head with an auxiliary combustion chamber and a mouth plate attached to the cylinder head for defining the auxiliary combustion chamber, said gasket having at least one first sealing area around the cylinder bore and at least one second sealing area adjacent the first sealing area, on which the mouth plate is placed, said second sealing area being defined by a curved outer line corresponding to a part of a contour of the mouth plate and an inner line corresponding to a part of a contour of the cylinder bore, comprising:

a first plate having a plurality of curved beads disposed at a predetermined distance away from each other and situated inside and outside the second sealing area, an inner bead being greater in height than an outer bead respectively so that resiliency of the beads decreases gradually from the inner bead to the outer bead, and at least one second plate situated adjacent to the first plate to form the steel laminate gasket.

* * * * *